United States Patent [19]

Rasmussen et al.

[11] 4,246,802
[45] Jan. 27, 1981

[54] FRICTION DRIVE MECHANISM FOR CONVERTING A ROTATIONAL MOVEMENT INTO AN AXIAL MOVEMENT, OR VICE VERSA

[76] Inventors: John Rasmussen, 21 Ørnebakken, Holte; Ole Hauberg, 16 Strandhojsvej, Charlottenlund, both of Denmark

[21] Appl. No.: 931,690

[22] Filed: Aug. 7, 1978

[30] Foreign Application Priority Data

Aug. 24, 1977 [DK] Denmark .................... 2761/77

[51] Int. Cl.² ............................................ F16H 21/16
[52] U.S. Cl. .......................................... 74/25; 74/206
[58] Field of Search ................. 74/25, 27, 89, 206

[56] References Cited

U.S. PATENT DOCUMENTS

| | | | |
|---|---|---|---|
| 2,204,638 | 6/1940 | Weathers | 74/25 |
| 3,272,021 | 9/1966 | Weber | 74/25 |
| 3,425,284 | 2/1969 | Shelton | 74/25 |
| 3,777,578 | 12/1973 | Swanberg | 74/89 |
| 3,981,203 | 9/1976 | Williams | 74/25 |

FOREIGN PATENT DOCUMENTS 1375464  11/1974  United Kingdom ............ 74/25

*Primary Examiner*—Kenneth Dorner

[57] ABSTRACT

A friction drive mechanism, in which two axially displaced sets of rolling members arranged in a common two-part holder are in external frictional engagement with a smooth shaft, the rolling members being inclined relative to the shaft to perform a rolling movement thereon by relative rotational movement between the holder and the shaft, the two holder parts being clamped together by a hinge joint providing an automatical load-dependent bias and adjustment of the frictional engagement between the rolling members and the shaft.

4 Claims, 3 Drawing Figures

FRICTION DRIVE MECHANISM FOR CONVERTING A ROTATIONAL MOVEMENT INTO AN AXIAL MOVEMENT, OR VICE VERSA

The invention relates to a friction drive mechanism for converting a rotational movement into an axial movement, or vice versa.

BACKGROUND OF THE INVENTION

Conversion of a rotational movement of a driving means into an axial movement of a load is most frequently performed by means of drive mechanisms operating according to the screw-nut principle, i.e. with a threaded engagement between twp parts, one of which is axially movable, whereas the other is rotatable. For example, in a so-called rolling screw, threaded rollers which are kept in a roller holder are moved around a central threaded shaft having a thread inclination corresponding to that of the rollers. The roller holder will move along the shaft as an ordinary nut when being turned around the shaft and securing the shaft against rotation..

If the roller holder during rotation is secured against axial movement, the shaft will perform an axial movement. Conversely, if the shaft is rotated and the roller holder is secured against rotation, either the roller holder or the shaft will perform an axial movement when the other part is secured against axial displacement. Furthermore, if the system is not self-blocking in the axial direction, an axial movement of one part will be convertible into rotation of the other part.

Thus, the rolling screw has the same movement possibilities as an ordinary screw-nut connection, but considered as a transmission mechanism, it suffers in the same manner as the screw-nut connection of several considerable disadvantages. On one hand, it is very difficult to provide a simple axial sealing around a threaded shaft and, on the other hand, threaded shafts in greater lengths can only be produced at quite considerable expences. Furthermore, the transmission ratio of the mechanism will be determined once for all by the thread inclination, so that a change of the transmission ratio may only be obtained by a completely new conbination of a threaded shaft and a nut or rolling screw, whereby it will not be possible in this manner to obtain a gear mechanism having a stepless variable transmission ratio.

DESCRIPTION OF THE PRIOR ART

Friction drive mechanisms are known, inter alia, from Danish Pat. Nos. 105,376, 134,498 and 134,528, in which an improvement relative to the screw-nut system has been obtained in that a smooth shaft is arranged in frictional engagement with three or four succeeding, axially displaced rolling members in the form of inner races of ball bearings surrounding the shaft, the outer races of said ball bearings being secured in bearing stands in a common holder in such a way that each inner race, the internal diameter of which must be greater than the outer diameter of the shaft, will perform a helical rolling movement on the shaft in the same direction and with a uniform inclination for all inner races, when the holder is rotated around the shaft. In a cinematic sense, these known friction drive mechanisms have the same movement possibilities as the screw-nut system.

In these known constructions, ball bearings are required having specially ground inner races which, as mentioned, are bound to have a greater internal diameter than the outer diameter of the shaft, so that it is not possible to use standard ball bearings. Furthermore, since in order to obtain an equal load on the bearings, it is usually necessary to use three bearings which must obviously be axially displaced, the shaft will unavoidably be exposed to bending forces due to the engagement pressure from each bearing acting on one side of the shaft only, and, as a result, the shaft may be subjected to deformations which may lead to deteriorated sealing and the excitation of oscillations, which problems cannot be completely eliminated even by a very close arrangement of the bearings.

Furthermore, in these known constructions, it will only be possible to utilize a fraction of the axial load capacity of the bearings. In practice, due to bearing tolerances, a reasonable equal load distribution can only be obtained with the use of three bearings, two of which compensate for the engagement pressure on the shaft from the third bearing. However, in case of more than three bearings, an increasingly uneven load distribution occurs, whereby a relatively low upper limit is set for the total axial load which can be allowed in such a construction.

Constructions of the kind mentioned hereinbefore, by which the problems caused by axially displaced bearings are avoided, are known, for example, from U.S. Pat. Nos. 3,272,021 and 3,981,203. In these known constructions, two axially displaced sets of rolling members are mounted in a common two-part holder in such a way that the rolling members of each set are in external frictional eggagement with the shaft in one and the same radial plane to the shaft. The necessary friction is obtained in that the two holder parts which are secured against relative axial displacement, are clamped together by means of spring-biased bolts which through bores in one holder part are screwed into threaded bores in the other holder part.

In the construction disclosed in U.S. Pat. No. 3,272,021, a possibility of decelerating the axial movement of the roller holder on the shaft is obtained by means of such spring-biased bolts for clamping the two holder parts together in connection with a rotating shaft, coupled to a drive motor, by constructing said shaft with sections of different diameters and an intermediate conical part, in which the shaft diameter increases gradually. When the roller holder moves in the direction of increasing shaft diameter, the two holder parts are forced from each other to a small extent, and due to the spring bias, a considerable increase of the friction between the rolling members and the shaft is thereby obtained. In this manner, it will be possible for a given construction by a suitable design of the shaft to obtain some adaption of the friction to a desired axial load capacity. However, this possibility has been obtained at the expense of a specially designed shaft which makes the construction more expensive, and the friction between the rolling members and the shaft is determined solely by the bias springs for the bolts clamping the two holder parts together and by the particular shaft design, so that with a given construction it is not possible to obtain adaption to any arbitrary axial load capacity.

SUMMARY OF THE INVENTION

Taking as a starting point a friction drive mechanism of the kind mentioned hereinbefore, it is the object of the invention to provide a construction, in which the friction between the rolling members and the shaft is automatically adapted to the actual axial load without the use of spring bias or a specially designed tapered shaft which requires a considerable radial displaceability of the two holder parts.

According to the invention, there is provided a friction drive mechanism for converting a rotational movement into an axial movement, or vice versa, and comprising a friction assembly cooperating with a driving means and a load, respectively, said friction assembly comprising a smooth shaft, at least two axially displaced sets of roller members, each set comprising at least four roller members, a common holder surrounding said shaft and rotatably journalling said rolling members in external frictional engagement with the shaft on opposite sides thereof, the axes of said rolling members not intersecting the axis of said shaft, and the places of engagement between the rolling members of each set and the shaft remaining substantially in a common radial plane to said shaft, whereby said rolling members during relative rotational movement between said holder and said shaft will perform a unidirectional, helical rolling movement with a uniform inclination on said shaft, said holder being made in two parts, and means for clamping said two holder parts together for securing frictional engagement between said rolling members and said shaft being constituted by a hinge joint connecting the two holder parts, only the portion of said hinge joint associated with one holder part being axially fixed relative to said driving means or said load, said hinge joint assuming in the absence of an axial load a neutral position substantially in parallel relationship to a radial plane to said shaft, said hinge joint having a dimensional stability such that in case of an axial load, it will be turned out from said neutral position to reduce the separation of the two holder parts, at least one holder part being connected solely with the other holder part through said hinge joint, but having no firm connection to said driving means for said load.

By means of such simple clamping means, there is obtained in an advantageous manner an automatic load-dependent adjustment of the friction between the rolling members and the smooth shaft which in this case is cylindrical without any cross-sectional variations.

In a preferred embodiment, the hinge joint is formed by bolts which through opposed bores in a yoke arranged in a recess on the external side of one holder part and in the two holder parts are screwed into a yoke arranged in a recess, on the external side of the other holder part.

In one design of such a friction drive mechanism, the bottom of each recess and the opposed side of the associated yoke are formed so as to allow the yoke to turn relative to the recess, but prevent the yoke from being axially displaced relative to the holder part in question, one of said holder parts being connected to said driving means or said load.

If the shaft in this embodiment is connected with a rotating drive means, the load which is to perform an axial movement is coupled solely to one holder part. Due to the load, a small relative axial displacement of the two holder parts will occur, whereby the holder parts will be clamped more tightly togehter around the shaft due to the hinge joint, the extent of this clamping and, thus, of the friction being dependent of the magnitude of the load. Thereby, in one and the same construction there may be obtained both a quite considerable axial load capacity and the advantage that in case of a smaller load, adjustment is automatically made to a relatively smaller friction which is more lenient to the rolling members.

As another possibility, one holder part may be coupled to a rotating drive means and secured against axial movement, whereas the load may be connected to a shaft, whereby the other holder part will be subjected by the load to a short axial displacement relative to the axially fixed holder part connected to the driving means, so that a load-dependent clamping of the two holder parts is obtained in the same way.

If the friction drive mechanism is used as a transmission mechanism between a driving means performing an axial movement and a load which is to perform a rotational movement, an automatic load-dependent bias is obtained in exactly the same manner by connecting the driving means and the load, respectively, to one holder part and the smooth shaft, or conversely.

In another design of the preferred embodiment, an automatic load-dependent bias is obtained in the same way, but without any relative axial displacement of the two holder parts in that a bearing is interposed between the bottom of the recess in one holder part and the associated yoke, said bearing allowing limited axial displacement of said yoke in said recess, said yoke being coupled to said driving means or said load, whereas the two holder parts are solely inter-connected through said hinge joint and prevented from axial displacement relative to each other.

BRIEF DESCRIPTION OF THE DRAWINGS

In the following, the invention will be explained in further detail with reference to the drawings, in which FIG. 1. is a perspective view of an embodiment of a friction drive mechanism according to the invention.

DETAILED DESCRIPTION.

Figure 1:
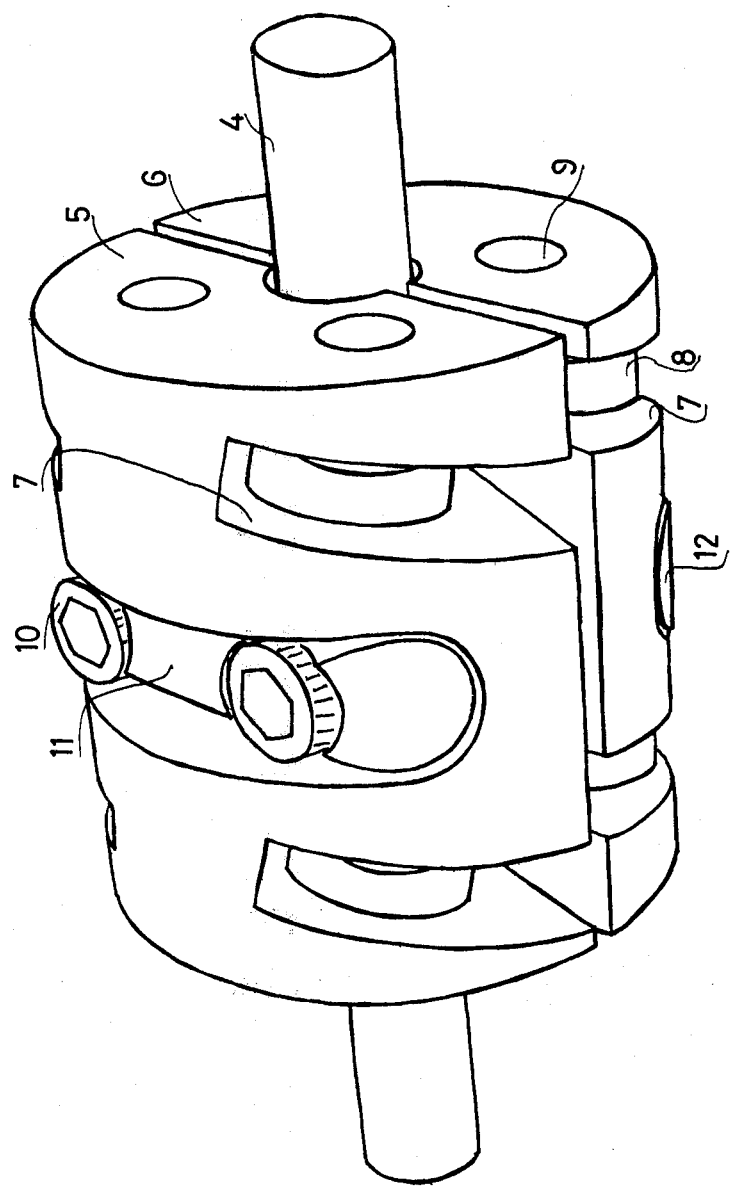
Figure 2:
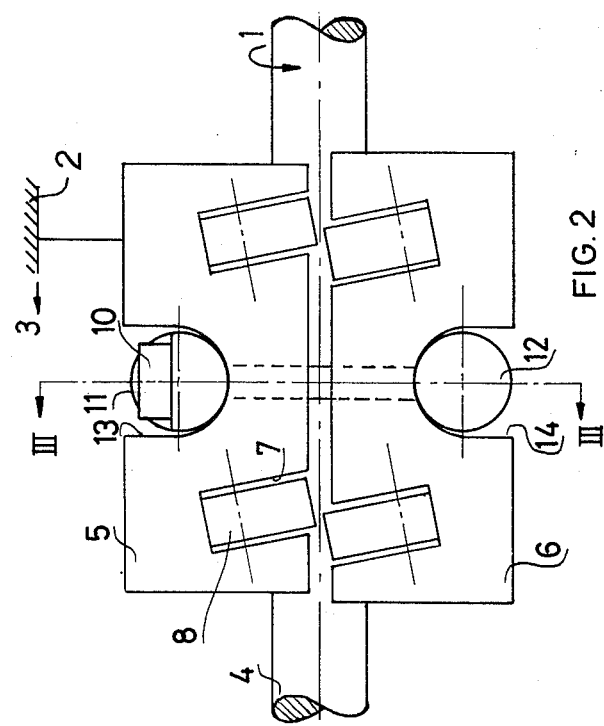
FIGS. 2 and 3 are a side view and a cross-sectional view, respectively, of the embodiment shown in FIG. 1.
Figure 3:
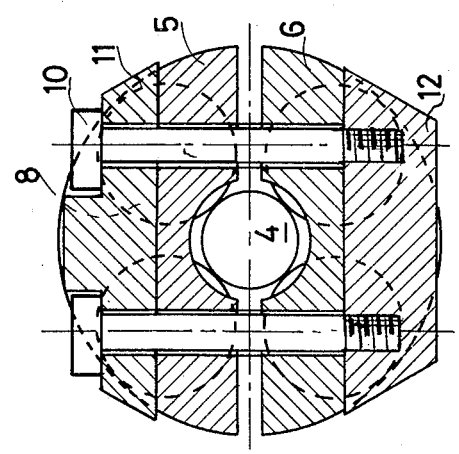

In FIGS. 1 to 3, a practical embodiment of the friction assembly in a friction drive mechanism according to the invention is shown, in which a smooth shaft 4 is surrounded by a roller holder having two holder parts 5 and 6, in the mainly flat surfaces of which facing each other and following in this case an axial plane of the shaft 4 opposed longitudinal depressions for the shaft 4 are formed. In milled grooves 7 in the holder parts 5 and 6, uniform rolling members 8 belonging to two sets of rolling members are journalled rotatably in such a way that their axes are inclined relative to the axis of the shaft and do not intersect the latter. If the holder 5, 6 is turned relative to the shaft 4, the rolling members 8 will perform a helical rolling movement on the surface of the shaft. If the shaft 4 is secured against rotation, and the holder 5, 6 against axial displacement, rotation of the holder 5, 6 will result in axial displacement of the shaft 4, or conversely. If the holder 5, 6 is secured against rotation, and the shaft 4 against displacement, rotation of the shaft 4 will result in axial displacement of the holder 5, 6, and conversely.

Thus, in a cinematic sense, such a friction assembly has the same movement possibilities as an ordinary screw-nut system.

The rotatable journalling of the rolling members 8 relative to the holder parts 5, 6 may be obtained by means of solid rolling members secured on roller pins, the ends of which are journalled in ball bearings in the holder. However, a simpler and less expensive construction involving a smaller number of ball bearings is obtained, if the rolling members themselves are constituted by the outer races of ball bearings, the inner races of which are secured on bearing pins which are connected with the holder. In both cases, the ball bearings to be used may be standard ball bearings, the dimensions of which do not depend on the outer diameter of shaft 4.

In the embodiment shown, each set of rolling members comprises four rolling members 8 which, as mentioned, may be constituted by the outer races of standard ball bearings, the inner races of which are secured on bearing pins, not shown, which are fixed in pin bores 9 in holder parts 5 and 6.

The two holder parts 5 and 6 are clamped together by means of two bolts 10 which in the embodiment shown have heads with internal hexagonal holes, which bolts extend through opposed bores in a yoke 11 on the external side of holder part 5 and in the two holder parts 5 and 6 and are screwed into threaded bores in an opposed yoke 12 on the external side of holder part 6. As most clearly shown in FIG. 2, these yokes 11 and 12 have, in this embodiment, a curved, substantially circular cross-sectional circumference and are arranged in milled recesses 13 and 14, respectively, in holder parts 5 and 6 with suitably curved bottom faces, so that each yoke 11 and 12 is allowed to turn in its recess, but is substantially secured against axial displacement relative to the holder part in question.

In the manner explained in the foregoing, by means of this simple clamping mechanism, an automatic load-dependent bias of the friction assembly is obtained when connecting the shaft 4 and one holder part 5 or 6, respectively, to a driving means and a load, or conversely, since the yokes 11 and 12 connected through the bolts 10 will act as a hinge joint which when exposed to an axial force will cause a quite short relative axial displacement of holder parts 5 and 6 in the direction of decreasing the separation of said parts, whereby the rolling members 8 are pressed into close frictional engagement with the shaft 4. As schematically indicated in FIG. 2 by an arrow 1, the shaft 4 could in this embodiment be connected to a rotating driving means, and the holder part 5 to a load as illustrated symbolically at 2, which is to be axially displaced in the direction shown by an arrow 3. Thus, in the hinge joint, only the part associated with holder part 5, i.e. the yoke 11, is axially fixed relative to the load.

However, with a suitable preceding clamping of the two holder parts, the above mentioned axial displacement will not be greater than the places of engagement between the shaft 4 and the rolling members 8 in each set of rolling members are maintained substantially in a common radial plane to the shaft.

Since the pressures of engagement from the rolling members 8 in each set of rolling members act upon the shaft 4 at four places of engagement with a mutual displacement of 90°, the shaft 4 is not exposed to bending effects, whereby it will be possible, in practice, to extend the friction assembly to an arbitrary desired number of rolling members sets corresponding to the axial load to be resisted. However, in case of a greater number of rolling member sets, a corresponding higher number of hinge joints of the kind illustrated ought possibly be used for securing sufficiently effective clamping.

Figure 4:
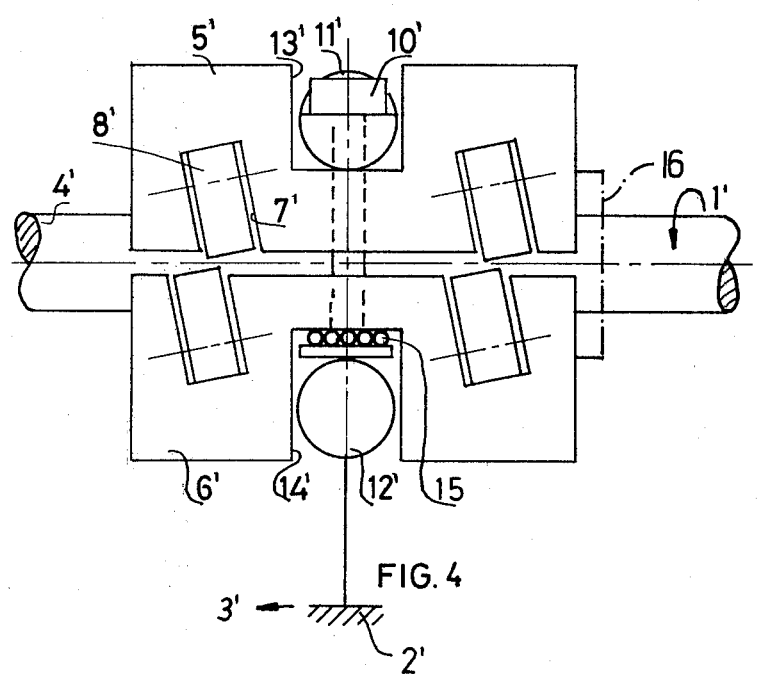
FIG. 4 is a side view of another embodiment.

In FIG. 4 a modification of the embodiment shown in FIGS. 1 to 3 is shown, by which two holder parts 5' and 6' surrounding a smooth shaft 4' and accommodating two sets of rolling members each having four rolling members 8' are clamped together by means of a hinge joint comprising bolts 10' and yokes 11' and 12'.

However, in this modification, relative axial displacement of holder parts 5' and 6' by an axial load has been avoided in that the recesses 13' and 14' milled in holder parts 5' and 6' have a flat bottom face, whereas the yokes 11' and 12' in the same way as in the embodiment shown in FIGS. 1 to 3 have a circular cross-section, while, furthermore, one yoke 12' is axially fixed as schematically indicated, and there is interposed between the underside of said yoke and the bottom face of the associated recess 14' a bearing device such as a rolling carriage 15 designed as a needle bearing, which allows limited axial movement of the holder part 6' relative to the yoke 12' under the pivoting movement of the hinge joint. In this case, an axial force will cause a simultaneous short axial displacement of both holder parts 5' and 6', which due to the axially fixed yoke 12' will be clamped more tightly together to bias the rolling members 8' into frictional engagement with the shaft 4'.

In the same way as in the embodiment shown in FIGS. 1 to 3, the shaft 4' may, as indicated by an arrow 1', be coupled to a rotating driving means. However, in the embodiment shown in FIG. 4, the load shown symbolically at 2', which is to be moved in the direction indicated by an arrow 3', is coupled solely to the yoke 12' positioned at the needle bearing 15, whereas holder parts 5' and 6' are secured against relative axial displacement, as indicated symbolically by a dot-and-dash line 16, said parts being connected, for example, to a common end flange.

In use of the friction assembly as a drive mechanism, the roller holder may, as another possibility, be connected to a rotating driving means which is arranged to be axially indisplaceable, and the movement of which is translated into axial movement of the shaft. The initial axial force causing the bias between the rolling members and the shaft is then obtained automatically at beginning rotation of the roller holder possibly in connection with some deceleration of the axial movement of the shaft. In the embodiment shown in FIGS. 1 to 3, in which the bias requires a short relative axial displacement of the two holder parts 5 and 6, the driving means may, in this case, be firmly connected only with one holder part. In the embodiment shown in FIG. 4, the driving means must be connected with the roller holder in such a way that the yoke 12' is axially fixed, but a possibility is maintained for simultaneous axial displacement of the holder parts 5' and 6'.

However, as mentioned in the foregoing, there may, in principle, also be used an axially movable driving means, the movement of which will be translated by the friction assembly into a rotational movement.

What is claimed is:

1. A friction drive mechanism for converting a rotational movement into an axial movement, or vice versa, and comprising a friction assembly cooperating with a driving means and a load, respectively, said friction assembly comprising a smooth shaft, at least two axially displaced sets of roller members, each set comprising at least four roller members, a holder surrounding said shaft and journalling said rolling members to be equally spaced around said shaft in external frictional engagement therewith and to be rotatable around axes having the same inclination to, but not intersecting the axis of said shaft, the points of engagement between the rolling memers of each set and the shaft remaining substantially in a common plane normal to the axis of said shaft, said holder being made in two parts each carrying two roller members of each set of roller members, and clamping means being provided for connecting said two holder parts with a tension sufficient to secure frictional engagement between said rolling members and said shaft, said clamping means comprising interconnected first and second portions engaging each of the two holder parts in a manner so as to be pivotable relative thereto about a respective pivot axis transverse to the axis of said shaft, only one of said portions being fixed relative to said driving means or said load, whereas the other portion has no firm connection with said driving means or said load, whereby in the absence of an axial load said clamping means assumes a neutral position with both of said pivot axes extending substantially in the same plane normal to the axis of said shaft, while in the presence of an axial load, the clamping means will be turned out from said neutral position to reduce the separation of the two holder parts.

2. A friction drive mechanism as claimed in claim 1, wherein said first and second portions of the clamping means are constituted by two yokes, each of which is arranged in a recess on the external side of its respective holder part, said yokes being connected by bolts extending through opposed bores in one of said yokes and the two holder parts and screwed into threaded bores in the other yoke.

3. A friction drive mechanism as claimed in claim 2, wherein the bottom of each of said recesses and the opposed side of the respective yoke are formed so as to allow the yoke to turn relative to the recess, but prevent the yoke from being axially displaced relative to the respective holder part.

4. A friction drive mechanism as claimed in claim 2, wherein a bearing is interposed between the yoke constituting the portion of said clamping means which is fixed relative to said driving means or said load and the bottom of the corresponding recess to allow limited axial displacement of said yoke in said recess, means being provided for preventing the two holder parts from axial displacement relative to each other.

* * * * *